United States Patent
Olsson

(12) 
(10) Patent No.: US 8,398,803 B2
(45) Date of Patent: Mar. 19, 2013

(54) METHOD FOR PROVIDING AN INSULATED ELECTRIC HIGH VOLTAGE DC CABLE OR A HIGH VOLTAGE DC TERMINATION OR JOINT

(75) Inventor: Carl-Olof Olsson, Västerås (SE)

(73) Assignee: ABB Research Ltd., Zürich (CH)

( * ) Notice: Subject to any disclaimer, the term of this patent is extended or adjusted under 35 U.S.C. 154(b) by 66 days.

(21) Appl. No.: 12/867,918

(22) PCT Filed: Feb. 10, 2009

(86) PCT No.: PCT/EP2009/051505
§ 371 (c)(1),
(2), (4) Date: Aug. 17, 2010

(87) PCT Pub. No.: WO2009/103630
PCT Pub. Date: Aug. 27, 2009

(65) Prior Publication Data
US 2010/0314022 A1    Dec. 16, 2010

(30) Foreign Application Priority Data
Feb. 20, 2008 (EP) .................................. 08101802

(51) Int. Cl.
*B29C 47/02* (2006.01)
*H01B 3/44* (2006.01)

(52) U.S. Cl. .............. 156/244.24; 156/51; 156/242; 156/244.11; 264/79; 264/171.14; 174/110 PM

(58) Field of Classification Search .......... 156/47, 156/51; 264/79, 171.14, 171.16; 174/110 PM
See application file for complete search history.

(56) References Cited

U.S. PATENT DOCUMENTS

| 2,462,149 | A | * | 2/1949 | Webb | 264/555 |
| 2,916,481 | A | * | 12/1959 | Gilmont | 525/387 |
| 3,014,799 | A | * | 12/1961 | Oster | 522/46 |
| 3,513,228 | A |   | 5/1970 | Miyauchi et al. | |
| 3,527,874 | A | * | 9/1970 | Toshiyuki | 174/24 |

(Continued)

FOREIGN PATENT DOCUMENTS

| EP | 0 168 332 | 1/1986 |
| GB | 2021595 A | 12/1979 |

(Continued)

OTHER PUBLICATIONS

Kageyama, S., M. Ono, and S. Chabata, "Microvoids in Crosslinked Polyethylene Insulated Cables", IEEE Transactions on Power Apparatus and Systems, vol. PAS-94, No. 4, Jul./Aug. 1975, pp. 1258-1265.*

(Continued)

*Primary Examiner* — William Bell
(74) *Attorney, Agent, or Firm* — Venable LLP; Eric J. Franklin

(57) ABSTRACT

A method for providing an insulated electric high voltage DC cable or a high voltage DC termination or joint. A polymer based insulation system including a compounded polymer composition is provided. The polymer based insulation system is subsequently exposed to a heat treatment procedure while the outer surface of the polymer based insulation system is covered by a cover impermeable to a substance present in the polymer based insulation system in a non-homogenous distribution, thereby equalizing the concentration of the substance in the polymer based insulation system.

20 Claims, 4 Drawing Sheets

U.S. PATENT DOCUMENTS

| | | | | |
|---|---|---|---|---|
| 3,529,340 A | * | 9/1970 | Polizzano et al. | 29/728 |
| 3,930,104 A | * | 12/1975 | MacKenzie et al. | 428/379 |
| 4,360,706 A | * | 11/1982 | Lanfranconi et al. | 174/105 SC |
| 5,449,488 A | * | 9/1995 | Karppo | 264/555 |
| 2002/0039654 A1 | | 4/2002 | Gustafsson et al. | |

FOREIGN PATENT DOCUMENTS

| | | | | |
|---|---|---|---|---|
| JP | 02253513 | A | * | 10/1990 |
| JP | 05198218 | A | * | 8/1993 |
| JP | 06023760 | A | * | 2/1994 |
| SU | 2127922 | | | 3/1999 |
| SU | 2173900 | C1 | | 9/2001 |

OTHER PUBLICATIONS

Machine translation of Japanese Patent Publication No. JP 06023760 A (Sumi), 1994, 3 pages.*

PCT/ISA/210—International Search Report—Mar. 25, 2009.

PCT/ISA/237—Written Opinion of the International Searching Authority—Mar. 25, 2009.

T. Nakatsuka et al; "The Effect on Dielecric Loss of Polyethylene Caused by Acetophenone and Cumylalcohol"; IEEE International Symposium on Electrical Insulation, Pittsburg, PA, Jun. 5-8, 1994; pp. 574-577.

Uno Gafvert et al; "Electrical Field Distribution in Transformer Oil"; IEEE Transactions on Electrical Insulation; vol. 27, No. 3, Jun. 1992; pp. 647-660.

C.O. Olsson; "Diffusion in Polymers With Temperature Dependent Properties"; 13$^{th}$ International Heat Transfer Conference, Sydney, Aug. 13-18, 2006; 13 pages.

\* cited by examiner

METHOD FOR PROVIDING AN INSULATED ELECTRIC HIGH VOLTAGE DC CABLE OR A HIGH VOLTAGE DC TERMINATION OR JOINT

CROSS-REFERENCE TO RELATED APPLICATIONS

This application claims priority to European patent application filed 20 Feb. 2008 and is the national phase under 35 U.S.C. §371 of PCT/EP2009/051505 filed 10 Feb. 2009.

TECHNICAL FIELD OF THE INVENTION

The present invention relates generally to high voltage electrical power equipment. More particularly, the invention relates to a method for providing an insulated electric high voltage DC cable or a high voltage DC termination or joint.

DESCRIPTION OF RELATED ART AND BACKGROUND OF THE INVENTION

Extruded solid insulation based on a polyethylene, or a cross linked polyethylene (XLPE), has for almost 40 years been used for AC transmission and distribution cable insulation.

Therefore the possibility of the use of XLPE for DC cable insulation has been under investigation for many years. Cables with such insulations have the same advantage as the mass impregnated cable in that for DC transmission there are no restrictions on circuit length and they also have a potential for being operated at higher temperatures, thus offering a possibility to increase the transmission load.

However, it has not been possible to obtain the full potential of these materials for full size cables. It is believed that one of the main reasons being the development and accumulation of space charges in the dielectric when subjected to a DC field. Such space charges distort the stress distribution and persist for long periods because of the high resistivity of the polymers. Space charges in an insulation body do, when subjected to the forces of an electric DC-field, accumulate in a way that a polarized pattern similar to a capacitor is formed.

There are two basic types of space charge accumulation patterns, differing in the polarity of the space charge accumulation. The space charge accumulation results in a local increase at certain points of the actual electric field in relation to the field, which would be contemplated when considering the geometrical dimensions and dielectric characteristics of insulation. The increase noted in the actual field might be 5 or even 10 times the contemplated field.

Thus, the design field for cable insulation must include a safety factor taking account for this considerably higher field resulting in the use of thicker and/or more expensive materials in the cable insulation. The build up of the space charge accumulation is a slow process, and therefore this problem is accentuated when the polarity of the cable after being operated for a long period of time at same polarity is reversed. As a result of the reversal a capacitive field is superimposed on the field resulting from the space charge accumulation and the point of maximal field stress is moved from the interface and into the insulation. Attempts have been made to improve the situation by the use of additives to reduce the insulation resistance without seriously affecting other properties.

An extruded resin composition for AC cable insulation typically comprises a polyethylene resin as the base polymer complemented with various additives such as a peroxide cross linking agent, a scorch retarding agent and an antioxidant or a system of antioxidants. In the case of an extruded insulation the semi-conductive shields are also typically extruded and comprise a resin composition that in addition to the base polymer and an electrically conductive or semi-conductive filler comprises essentially the same type of additives. The various extruded layers in an insulated cable in general are often based on a polyethylene resin. Polyethylene resin means generally and in this application a resin based on polyethylene or a copolymer of ethylene, wherein the ethylene monomer constitutes a major part of the mass.

Thus polyethylene resins may be composed of ethylene and one or more monomers which are co-polymerisable with ethylene. Low density polyethylene (LDPE) is today the predominant insulating base material for AC cables. To improve the physical properties of the extruded insulation and its capability to withstand degradation and decomposition under the influence of the conditions prevailing under production, shipment, laying, and use of such a cable the polyethylene based composition typically comprises additives such as stabilizing additives, e.g. antioxidants, electron scavengers to counteract decomposition due to oxidation, radiation etc., lubricating additives, e.g. stearic acid, to increase processability, additives for increased capability to withstand electrical stress, e.g. an increased water tree resistance, e.g. polyethylene glycol, silicones etc., and cross-linking agents such as peroxides, which decompose upon heating into free radicals and initiate cross-linking of the polyethylene resin, sometimes used in combination with unsaturated compounds having the ability to enhance the cross-linking density, scorch retarders to avoid premature cross-linking.

The number of various additives is large and the possible combinations thereof are essentially unlimited. When selecting an additive or a combination or group of additives the aim is that one or more properties shall be improved while others shall be maintained or if possible also improved. However, in reality it is always next to impossible to forecast all possible side effects of a change in the system of additives. In other cases the improvements sought for are of such dignity that some minor negative have to be accepted, although there is always an aim to minimize such negative effects.

Although some disadvantages with the use of an XLPE composition have been known for a long time its advantages (e.g. its ability to prevent scorch, i.e., premature cross linking) have outweighed these drawbacks. Furthermore it is well known that this type of XLPE composition exhibits a strong tendency to form space charges under DC electric fields, thus making it unusable in insulation systems for DC cables. However, it is also known that extended degassing, i.e., exposing the cross linked cable insulation to high temperatures for long periods of time, will result in a decreased tendency to space charge accumulation under DC voltage stress. It is generally believed that the heat treatment removes the peroxide decomposition products, such as acetophenone and cumyl alcohol, from the insulation whereby the space charge accumulation is reduced. Degassing is a time-consuming batch-process comparable with impregnation of paper insulations and thus as costly. Therefore it is advantageous if the need for degassing is removed. Most known cross-linked polyethylene compositions used as extruded insulation in AC-cable exhibit a tendency for space charge accumulation which renders them unsuitable for use in insulation systems for DC cables.

SUMMARY OF THE INVENTION

Thus it is desirous to provide a process for production of an insulated DC cable with an extruded polymer based electrical insulation system suitable for use as a transmission and distribution cable in networks and installations for DC transmission and distribution of electric power. The process for application and processing of then extruded insulation system shall preferably be carried out in a manner such that there is no need for any lengthy time consuming batch-treatment. (e.g. heat treatment) of the cable to ensure stable and consistent dielectric properties and a high and consistent electric strength of the cable insulation. The resulting cable insulation shall further exhibit a low tendency to space charge accumulation, a high DC breakdown strength, a high impulse strength and high insulation resistance. The adoption of such a process would offer both technical and economical advances over prior art methods as production time and production costs can be reduced and the possibility for an essentially continuous or at least semi-continuous process for the application and processing of the cable insulation system is provided. Further the process shall ensure that the reliability, the low maintenance requirements and the long working life of a conventional DC-cable, comprising an impregnated paper-based insulation, shall be maintained or improved.

It is an object of the present invention to provide a method for providing an insulated electric high voltage DC cable as specified in the foregoing. It is also an object of the invention to provide a high voltage DC termination or joint having similar properties.

According to one aspect of the invention there is provided a method for providing an insulated electric high voltage DC cable or a high voltage DC termination or joint. The method comprises the steps of: providing a polymer based insulation system comprising a compounded polymer composition, preferably a compounded polyethylene composition; optionally cross-linking the polymer composition; and finally exposing the polymer based insulation system to a heat treatment procedure while the outer surface of the polymer based insulation system is covered by a cover impermeable to at least one substance present in the polymer based insulation system in a non-homogenous distribution, thereby equalizing the concentration of the at least one substance in the polymer based insulation system. The at least one substance comprises typically cross linking products and additives of different kinds as discussed above, which substances typically increase the conductivity.

By the provision of such method the concentration of the at least one substance and thus conductivity at the interfaces, i.e. inner and outer surfaces, of the polymer based insulation system can be increased to thereby reduce the electric field and space charge at these interfaces.

In one embodiment the above heat treatment procedure is performed after a heat treatment for removal of e.g. methane from the polymer based insulation system. As a result of this earlier heat treatment the concentration profile changes from a parabolic shape to a monotonously decreasing concentration profile towards the outer surface of the polymer based insulation system. Thus, the later heat treatment with the impermeable cover is preferably performed to increase the concentration of the at least one substance adjacent to the outer surface of the polymer based insulation system.

In one embodiment the method is for production of insulated electric high voltage DC cable and the step of providing a polymer based insulation system includes extruding the polymer based insulation system around a conductor.

The cover impermeable to the at least one substance may be a cover wrapped around a roll of extruded DC cable as having been rolled up on a drum or in a vessel. Alternatively, the later heat treatment is made subsequent to the covering of the extruded DC cable by a lead sheet, metal laminate and/or an outer covering or sheath provided that this layer is impermeable to the at least one substance present in the extruded insulation system.

Further characteristics of the invention and advantages thereof will be evident from the following detailed description of embodiments of the invention.

DETAILED DESCRIPTION OF EMBODIMENTS

Figure 1:
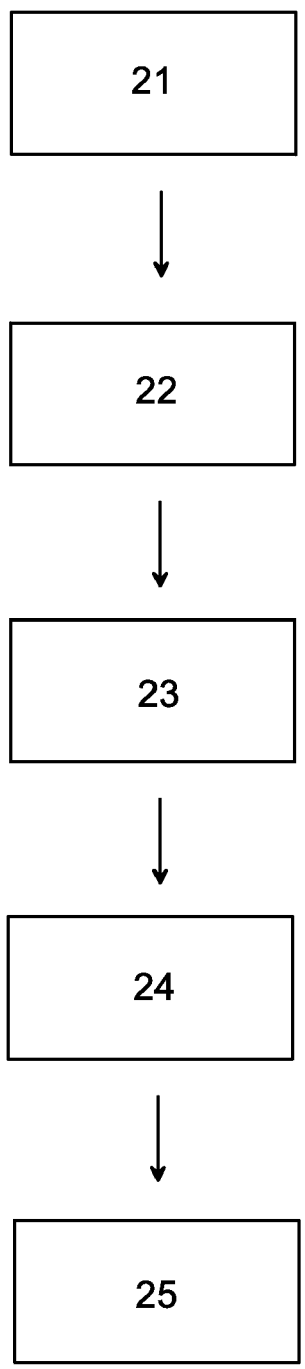
FIG. 1 is a flow scheme of a method for production of an insulated electric high voltage DC cable according to an embodiment of the present invention.

A method for production of an insulated electric high voltage DC cable according to an embodiment of the present invention will now be described with reference to FIGS. 1 and 2. The latter Figure shows the insulated electric high voltage DC cable in a section view. The DC cable comprises from the center and outwards: a stranded multi-wire conductor 10, a first extruded semi-conducting shield 11 disposed around and outside the conductor 10, an extruded polyethylene based conductor insulation 12 with an extruded, cross-linked composition as further described below, a second extruded semi-conducting shield 13 disposed outside the conductor insulation 12, a metallic screen 14, and an outer covering or sheath 15 arranged outside the metallic screen 14.

The DC cable can when found appropriate be further complemented in various ways with various functional layers or other features. It can for example be complemented with a reinforcement in form of metallic wires outside the outer extruded shield 13, a sealing compound or a water swelling powder introduced in metal/polymer interfaces or a system achieved by e.g. a corrosion resistant metal polyethylene laminate and longitudinal water sealing achieved by water swelling material, e.g. tape or powder beneath the sheath 15. The conductor need not be stranded but can be of any desired shape and constitution, such as a stranded multi-wire conductor, a solid conductor or a segmental conductor.

According to the method for production of the insulated electric high voltage DC cable, a polymer based insulation system is, in a step 21, extruded around the conductor 10, wherein the polymer based insulation system comprises the semi-conducting shield 11, the polyethylene based conductor insulation 12, and the second semi-conducting shield 13. In an alternative embodiment the polyethylene based conductor insulation 12 is exchanged for other polymer based conductor insulation.

Below is a short description of one exemplary method of performing the extrusion. A person skilled in the art realizes that there are other extrusion techniques that can be used with the present invention.

In the exemplary method the conductor is fed from a conductor pay-off through the extruder equipment and other processing and conditioning devices and is finally taken up on a cable core take-up. The conductor pay-off and cable core take-up may be reels or drums suitable for discrete lengths but can be of any suitable type including devices for essentially continuous handling of the supplied conductor and produced cable. The conductor is passed over a first wheel through a conductor preheater wherein it is preheated for a suitable temperature before the insulation system is applied by extrusion. The process is suitable for true triple extrusion where a triple head extruder is used. The inner and outer semi-conductive layers are applied using two separate extruders and a further third extruder is used for the main insulation.

After the extrusion operation the extruded polyethylene based conductor insulation 12 is advantageously, in a step 22, cross-linked. To this end the insulated DC cable is passed through a pressurized curing and cooling chamber, wherein the conditions is controlled to ensure the desired cross-linking degree and other structural characteristics that can be effected by this controlled conditioning and cooling of the extruded insulation system. Typically, the extruded polyethylene based conductor insulation 12 includes a number of additives, among them dicumylperoxide and additives. Thereafter the cable is hauled through a haul-off caterpillar and over a second wheel before being taken up for further processing.

The above approach offers the possibility of an essentially continuous or semi-continuous process for the application and processing of the extruded insulation system.

As a result of the process, however, methane may be created in the cross-linked polyethylene based conductor insulation 12. Any methane may be removed by exposing, in a step 23, the extruded DC cable to a heat treatment while the outer surface of the extruded polymer based insulation system is kept free from any covering to thereby allow the methane to leave.

Next, in a step 24, the outer surface of the extruded polymer based insulation system is covered by a cover impermeable to one or more substances present in the extruded insulation system in a non-homogenous distribution.

The one or more substances include preferably one or more rest or byproducts from the cross-linking and/or one or more additives. The rest products include typically peroxide decomposition products, such as acetophenone and cumyl alcohol, and the additives include typically one or more antioxidants and scorch retarders. However, other additives may be of equal or even higher importance.

The extruded DC cable may be rolled up on a drum or in a vessel and the entire roll of extruded DC cable can be covered by a cover impermeable to the one or more substances. Preferably a thin metallic foil or similar is wrapped around the roll of DC cable.

Alternatively, the cover impermeable to the one or more substances can be the metallic screen 14 or the outer covering or sheath 15 arranged outside the metallic screen 14. The metallic screen 14 may be of lead sheet or metal laminate.

Next, after having covered the extruded DC cable with the impermeable cover, the extruded DC cable is, in a step 25, exposed for a heat treatment procedure in order to equalize the concentration of the one or more substances in the extruded insulation system, in particular adjacent to the outer surface of the extruded insulation system. In particular, since the first heat treatment for removal of methane typically causes the concentration profile to shift from a parabolic shape to a monotonously decreasing concentration profile as seen from an inner surface of the extruded insulation system, the second heat treatment with the impermeable cover causes the concentration of the one or more substances to increase adjacent to the outer surface of the extruded insulation system.

This heat treatment procedure may be performed depending on the particular applications and on the particular cross linking additives used. However, temperature and treatment times which typically are used for the common additives used today are indicated below.

The heat treatment procedure is preferably performed at a temperature of between 50 and 120° C., and more preferably between 70 and 90° C., and for a time that is shorter the higher the temperature is, preferably between 24 and 72 hours when the temperature is 80° C.

Finally, the metallic screen 14 and the outer covering or sheath are provided if not already provided as the impermeable cover.

Figure 2:
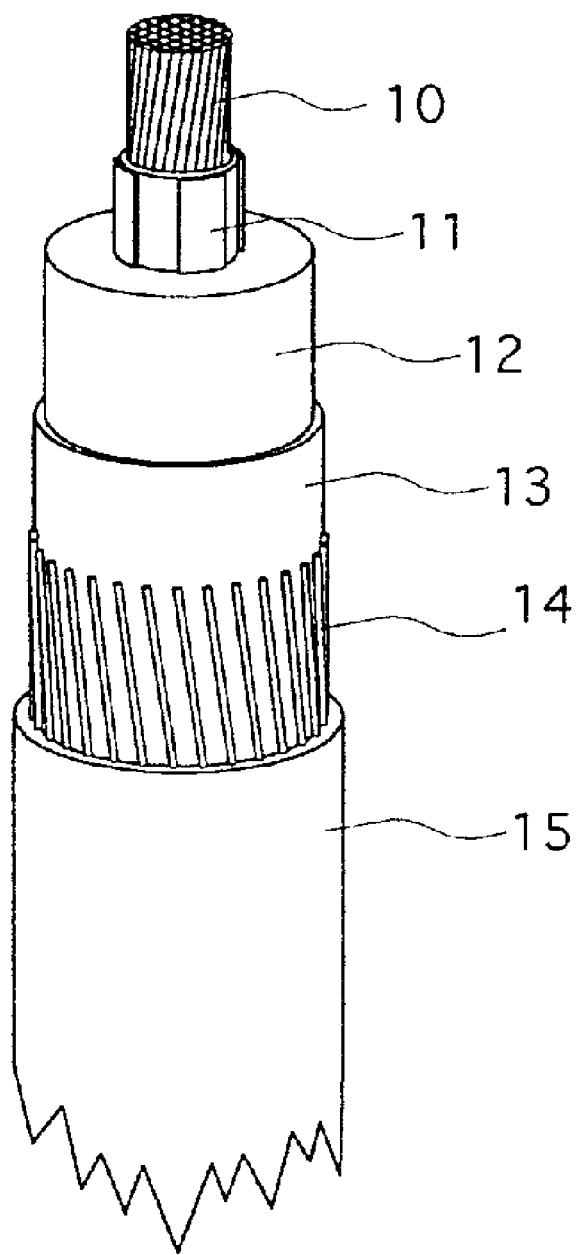
FIG. 2 illustrates schematically in a perspective view a high voltage DC cable as manufactured according to the flow scheme of FIG. 1.
Figure 3A:
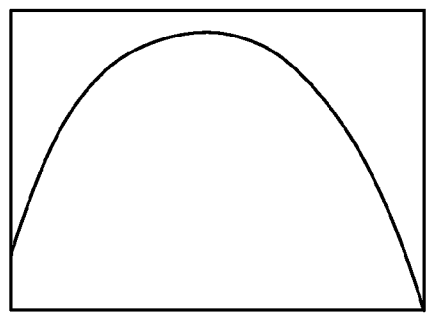
FIGS. 3$a$-$c$ are diagrams of the concentration, electric field, and space charge as functions of a radial distance within a polymer based insulation system of the high voltage DC cable of FIG. 2 prior to a heat treatment process for removal of methane from the polymer based insulation system.
Figure 3B:
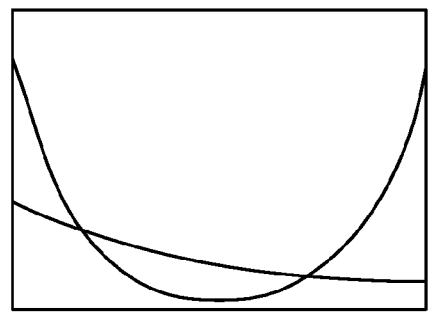
Figure 3C:
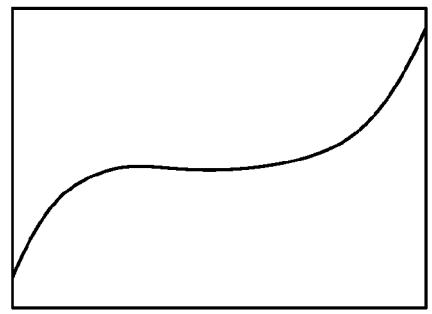

FIGS. 3a-c are diagrams of the concentration, electric field, and space charge as functions of a radial distance within the extruded insulation system of the high voltage DC cable of FIG. 2 prior to a heat treatment process for removal of methane from the extruded insulation system as calculated by a simplified model. Left hand side of the diagrams corresponds to a position at the inner surface of the extruded insulation system and right hand side corresponds to a position at the outer surface of the extruded insulation system. As can be seen the concentration profile has a parabolic shape (FIG. 3a). The monotonously decreasing electric field would be obtained if the electric field was not depending on the concentration profile of the one or more substances (FIG. 3b). However, if the electric field is dependent on the one or more substances an electric field profile with high electric field levels at the inner and outer surfaces of the extruded insulation system is obtained due to higher resistivities there (FIG. 3b). The space charge has a distribution which increases towards the outer surface of the extruded insulation system (FIG. 3c).

Figure 4A:
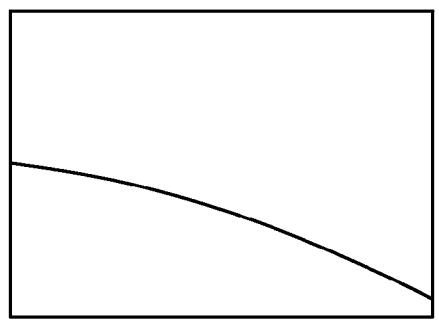
FIGS. 4$a$-$c$ are diagrams of the concentration, electric field, and space charge as functions of a radial distance within a polymer based insulation system of the high voltage DC cable of FIG. 2 subsequent to a heat treatment process for removal of methane from the polymer based insulation system.
Figure 4B:
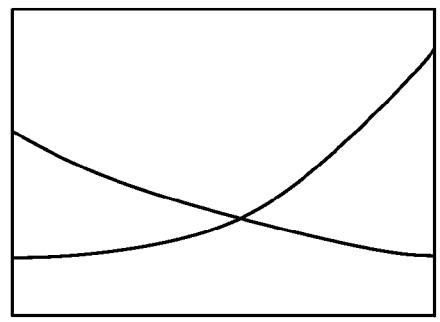
Figure 4C:
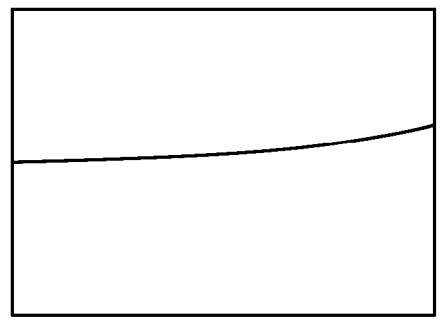

FIGS. 4a-c are diagrams of the concentration, electric field, and space charge as functions of a radial distance within a polymer based insulation system of the high voltage DC cable of FIG. 2 subsequent to the heat treatment process for removal of methane from the extruded insulation system as calculated by a simplified model. Left hand side of the diagrams corresponds as before to a position at the inner surface of the extruded insulation system and right hand side corresponds to a position at the outer surface of the extruded insulation system. Here the concentration profile is monotonously decreasing towards the outer surface of the extruded insulation system (FIG. 4a). As before, the monotonously decreasing electric field would be obtained if the electric field was not depending on the concentration profile of the one or more substances (FIG. 4b). However, if the electric field is dependent on the one or more substances an electric field distribution which increases towards the outer surface of the extruded insulation system is obtained (FIG. 4b). The space charge has a distribution which increases slightly towards the outer surface of the extruded insulation system (FIG. 4c).

The diagrams of FIGS. 3 and 4 are generated assuming that the temperature distribution is uniform and that the electric field dependence of the conductivity is neglected. In a real situation, temperature gradients and processes such as charge injection at the interfaces and dissociation within the insulation material may be present and influence the electric field distribution.

However, it is quite clear that the present invention, while removing large gradients in cross linking products adjacent to the inner and outer surfaces of the extruded insulation system and focusing less on the average concentrations of the cross linking products, improves the electric field and space charge distributions within the extruded insulation system. In other words, controlling the concentration profiles is shown to be of outermost importance for controlling the electric field and space charge distributions.

It shall be appreciated that the present invention is equally applicable to high voltage DC terminations and/or joints, which have not necessarily to be extruded.

The terminations and/or joints may be formed by molding a polymer based insulation system.

In one embodiment the polymer based insulation system is pre-molded and exposed to the inventive heat treatment procedure. As such the molded terminations and/or joints may be marketed and sold. During installation the molded terminations and/or joints are provided around the electrical conductor.

In an alternative embodiment the molded polymer based insulation system is molded, preferably via extrusion molding or tape molding, around a conductor prior to the step of exposing the polymer based insulation system to the heat treatment procedure.

The invention claimed is:

1. A method for providing an insulated electric high voltage DC cable or a high voltage DC termination or joint, the method comprising:
   providing a polymer based insulation system comprising a compounded polymer composition, wherein providing the polymer based insulation system comprises exposing the polymer based insulation system to a heat treatment procedure while an outer surface of the polymer based insulation system is covered by a cover impermeable to at least one substance present in the polymer based insulation system in a non-homogenous distribution, thereby equalizing a concentration of the at least one substance in the polymer based insulation system,
   wherein the method is a method for production of insulated electric high voltage DC cable, and wherein providing a polymer based insulation system includes extruding the polymer based insulation system around a conductor, and
   wherein the extruded DC cable is rolled up on a drum or in a vessel and the roll of extruded DC cable is covered by the cover impermeable to the at least one substance.

2. The method according to claim 1, wherein the extruded DC cable is covered by at least one of a lead sheet, metal laminate or an outer covering or sheath and the exposure of the DC cable to the heat treatment procedure is performed subsequently thereto.

3. The method according to claim 1, wherein the extruded DC cable is exposed to a heat treatment while the outer surface of the extruded polymer based insulation system is not covered by the impermeable cover to remove a second substance present in the polymer based insulation system after cross-linking; and wherein said exposure of the extruded polymer based insulation system to the heat treatment procedure while the outer surface of the extruded polymer based insulation system is covered by the cover is performed after removal of said second substance to thereby increase the concentration of the at least one substance adjacent to the outer surface of the extruded polymer based insulation system.

4. The method according to claim 3, wherein said second substance is methane.

5. The method according to claim 1, wherein the method is a method for providing a high voltage DC termination or joint, and wherein providing a polymer based insulation system includes molding the polymer based insulation system.

6. The method according to claim 5, wherein the molded polymer based insulation system is molded around a conductor prior to the step of exposing the polymer based insulation system to a heat treatment procedure.

7. The method according to claim 6, wherein the molded polymer based insulation system is molded via extrusion molding or tape molding.

8. The method according to claim 1, wherein said compounded polymer composition is a compounded polyethylene composition.

9. The method according to claim 1, wherein the concentration of the at least one substance is equalized adjacent to the outer surface of the extruded polymer based insulation system.

10. The method according to claim 1, wherein said compounded polymer composition is cross-linked before said exposing the polymer based insulation system to the heat treatment procedure.

11. The method according to claim 10, wherein the at least one substance includes a rest or byproduct from the cross-linking.

12. The method according to claim 11, wherein the rest or byproduct from the cross-linking comprises a peroxide decomposition product.

13. The method according to claim 1, wherein the at least one substance includes an additive.

14. The method according to claim 13, wherein said additive is an antioxidant.

15. The method according to claim 1, wherein the heat treatment procedure is performed at a temperature of between 50 and 120° C.

16. The method according to claim 15, wherein the heat treatment procedure is performed at a temperature of between 70 and 90° C.

17. The method according to claim 1, wherein the heat treatment procedure is performed for a time that is dependent on the temperature at which the heat treatment procedure is performed.

18. The method according to claim 1, wherein the cover comprises a metallic foil.

19. A method for providing an insulated electric high voltage DC cable or a high voltage DC termination or joint, the method comprising:
   providing a polymer based insulation system comprising a compounded polymer composition, wherein providing the polymer based insulation system comprises exposing the polymer based insulation system to a heat treatment procedure while an outer surface of the polymer based insulation system is covered by a cover impermeable to at least one substance present in the polymer based insulation system in a non-homogenous distribution, thereby equalizing a concentration of the at least one substance in the polymer based insulation system,
   wherein the method is a method for providing a high voltage DC termination or joint, and wherein providing a polymer based insulation system includes molding the polymer based insulation system, and
   wherein the molded polymer based insulation system is provided around a conductor subsequent to exposing the polymer based insulation system to a heat treatment procedure.

20. The method according to claim 19, wherein the molded polymer based insulation system is molded via extrusion molding or tape molding.

* * * * *